(12) United States Patent
Smith

(10) Patent No.: US 6,526,068 B2
(45) Date of Patent: Feb. 25, 2003

(54) INTERFACE CONTROL OF COMMUNICATION BETWEEN A CONTROL PROCESSOR AND A DIGITAL SIGNAL PROCESSOR

(75) Inventor: Wesley H. Smith, Raleigh, NC (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/024,423

(22) Filed: Dec. 17, 2001

(65) Prior Publication Data

US 2002/0085575 A1 Jul. 4, 2002

Related U.S. Application Data

(63) Continuation of application No. 08/940,797, filed on Sep. 30, 1997.

(51) Int. Cl.$^7$ ............................ H04J 3/24; G06F 3/00; G06F 3/02; G06F 3/05; G06F 3/06; G06F 5/00
(52) U.S. Cl. ........................................ 370/474; 710/52
(58) Field of Search ........................ 370/389, 412–418, 370/464–466, 474; 710/22, 52, 56

(56) References Cited

U.S. PATENT DOCUMENTS

| | | | |
|---|---|---|---|
| 4,578,789 A | 3/1986 | Middleton et al. ............ 370/58 |
| 4,589,107 A | 5/1986 | Middleton et al. ............ 370/62 |
| 4,644,527 A | 2/1987 | Anderson et al. ............. 370/58 |
| 4,672,602 A | 6/1987 | Hargrave et al. ............. 370/58 |
| D293,317 S | 12/1987 | Umezu et al. ................ D14/52 |
| 4,782,482 A | 11/1988 | Kiatipov et al. ............... 370/86 |
| 4,987,492 A | 1/1991 | Stults et al. .................. 358/181 |
| 5,214,650 A | 5/1993 | Renner et al. ............. 370/110.1 |
| 5,359,709 A * | 10/1994 | Blanc et al. .................. 375/222 |
| 5,469,558 A * | 11/1995 | Lieberman et al. .......... 710/105 |
| 5,475,691 A | 12/1995 | Chapman et al. ......... 370/110.4 |
| 5,475,713 A | 12/1995 | Bremer et al. ............... 375/261 |
| 5,487,175 A | 1/1996 | Bayley et al. .............. 455/54.2 |
| 5,506,866 A | 4/1996 | Bremer et al. ............... 375/216 |
| 5,513,212 A | 4/1996 | Bremer ........................ 375/222 |
| 5,513,251 A | 4/1996 | Rochkind et al. ............. 379/93 |
| 5,559,791 A | 9/1996 | Bremer et al. ................. 370/20 |
| 5,600,649 A | 2/1997 | Sharma et al. .............. 370/435 |
| 5,761,516 A * | 6/1998 | Rostoker et al. ............ 709/100 |
| 5,805,636 A * | 9/1998 | Rao et al. .................... 375/222 |
| 5,838,994 A | 11/1998 | Valizadeh .................... 711/171 |
| 5,909,559 A | 6/1999 | So ............................... 710/127 |
| 5,923,852 A | 7/1999 | Lee et al. .................... 709/234 |
| 6,108,343 A * | 8/2000 | Cruickshank et al. ........ 370/259 |

* cited by examiner

*Primary Examiner*—Kwang Bin Yao
*Assistant Examiner*—Kevin L. Harper
(74) *Attorney, Agent, or Firm*—Blakely, Sokoloff, Taylor & Zafman LLP

(57) ABSTRACT

A digital simultaneous voice and data (DSVD) system includes a communication random access memory (COMMRAM) driver and interface for dynamically remapping COMMRAM memory contents. The communication RAM is portable to selected hardware including direct memory address (DMA) based communications equipment and is connected between a digital signal processor (DSP) and a control processor (CP).

17 Claims, 10 Drawing Sheets

INTERFACE CONTROL OF COMMUNICATION BETWEEN A CONTROL PROCESSOR AND A DIGITAL SIGNAL PROCESSOR

This is a continuation of application Ser. No. 08/940,797, filed on Sep. 30, 1997.

BACKGROUND OF THE INVENTION

1. Field of the Invention

The field of the present invention relates to interface control devices and methods for control processors and digital signal processors and more particularly to digital simultaneous voice and data (DSVD) and statistical multiplexing (stat mux) systems and methods including control processors and digital signal processors.

2. Description of Related Art

Art related to the present invention includes systems and methods for processing multiple channels of data provided in opposite directions in order to support digital simultaneous voice and data (DSVD) communication between a control processor (CP) and a digital signal processor (DSP) connected to plural selected peripherals including, for example, a public switch telephone (PSTN) line, a phone or microphone, or a video connection.

Such multiple channels have in the past transmitted command packets, data packets of various types, debug messages, and bulk delay signals through a random access memory (RAM) interface. It is known for each channel in such systems to have a fixed RAM region with associated interrupt overhead. This limits data throughput and causes excessive interrupts.

It is accordingly intended to accomplish a high communication rate in DSVD systems without excessive interrupts.

SUMMARY OF THE INVENTION

According to the present invention, a digital simultaneous voice and data (DSVD) system includes a communications random access memory (COMMRAM) including at least one dynamically reconfigurable COMMRAM channel memory region for concurrently channeled bidirectional data traffic and a digital signal processor (DSP) including a plurality of FIFO elements for storing information to be communicated with selected external peripheral systems.

DETAILED DESCRIPTION OF A PREFERRED MODE

Figure 1A:
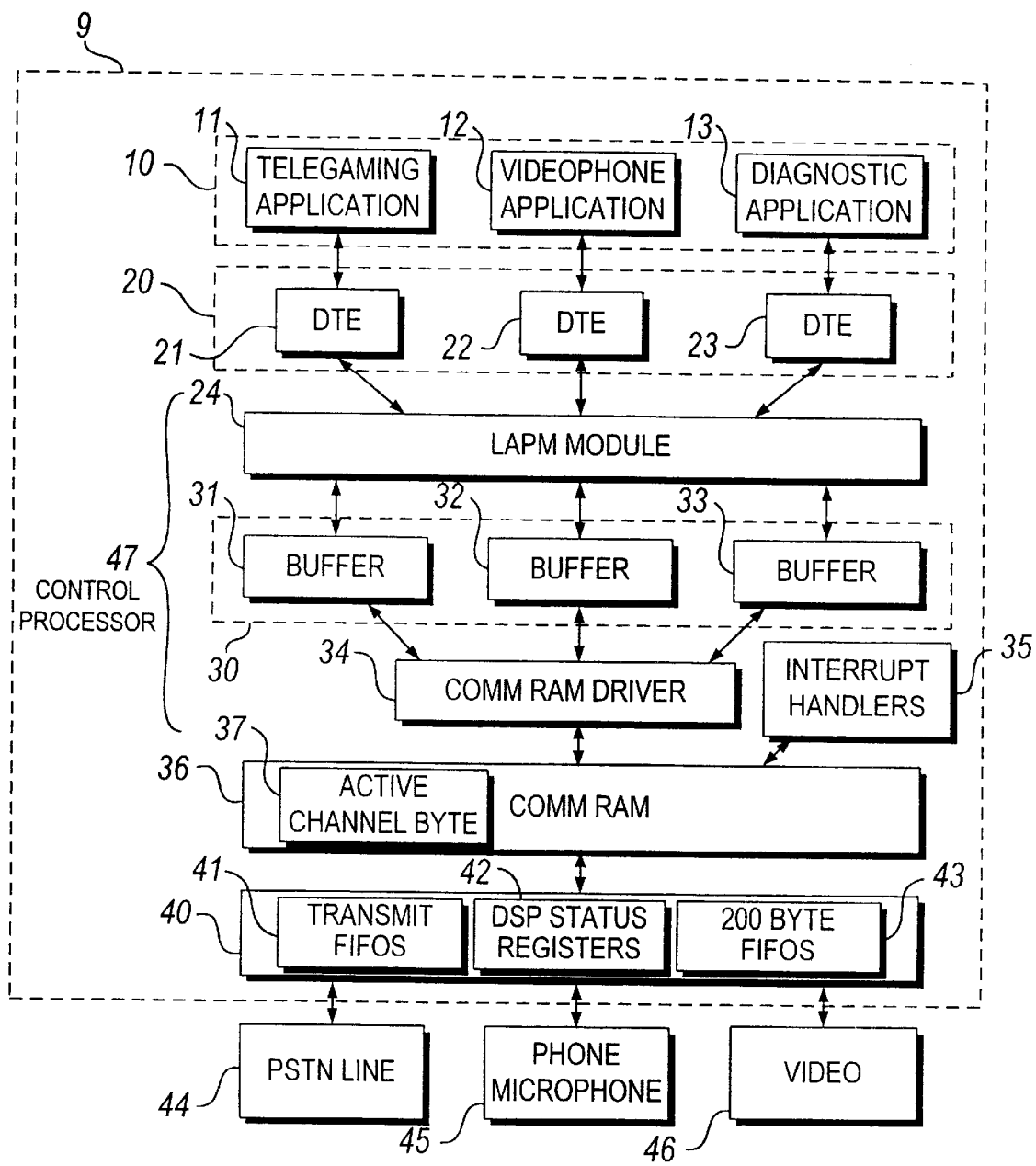
FIG. 1A is a first block diagram of a digital simultaneous voice and data (DSVD) and statistical multiplexing (stat mux) system according to the present invention.

Referring to FIG. 1A, there is shown a first block diagram of a digital simultaneous voice and data (DSVD) and statistical multiplexer (stat mux) system (DSS) according to the present invention. DSVD system 9, according to one embodiment of the present invention, supports bidirectional communication of multiple channels of data with one or more of application programs 10 (including, for example without limitation, a telegaming application 11, a video phone application 12, and a diagnostic application 13), with one or more data terminal equipment systems (DTE's) 20, through a link access procedure modem (LAPM) module 24, through one or more buffers 31 of a control processor, through a communication random access memory (RAM) driver circuit 34, through a communication RAM 36, and through a digital signal processor (DSP) 41 with a plurality of peripherals including, for example, public switched telephone network (PSTN) line 44, a phone or microphone 45, and a video device 46. LAPM module 24, buffers 30, COMMRAM driver 34, and interrupt handlers are organized as control processor 47. Application programs 10 include, according to one embodiment of the present invention, selected first, second, and third application programs respectively 11, 12, and 13. Particular examples of application programs include video phone programs, diagnostic programs, and telegaming programs such as Doom and Descent. To play such applications may require transmission of voice, data, and video information. DTE's 20 include, according to one embodiment of the present invention, first, second, and third DTE's including a first DTE 21, a second DTE 22, and a third DTE 23. First through third DTE's 21–23 communicate respectively with first through third application programs 11–13, and with LAPM module 24. Data accordingly flows bidirectionally according to the present invention through LAPM module 24 and buffers 30 in a plurality of directionally configurable channels. Buffers 30 include, according to one embodiment of the present invention, first, second, and third buffers, respectively buffer 31, buffer 32, and buffer 33. Buffers 30 each communicate bidirectionally with LAPM module 24 and communication RAM driver 34. Communication RAM 36 communicates with communication RAM driver 34 and DSP 40. DSP 40 communicates directly and bidirectionally with one or more external systems or devices including but not limited to a public switched telephone network (PSTN) line 44, a phone or microphone 95, or a video system 46, for example. DSP 40 includes transmit FIFOs 41, DSP status register (as will be discussed in connection with FIG. 2, which contain at least a single status bit indicative of whether particular DSP bi-directional transmit buffers are available for additional data packets to be transmitted), and 200 byte FIFOs 43.

Figure 1B:
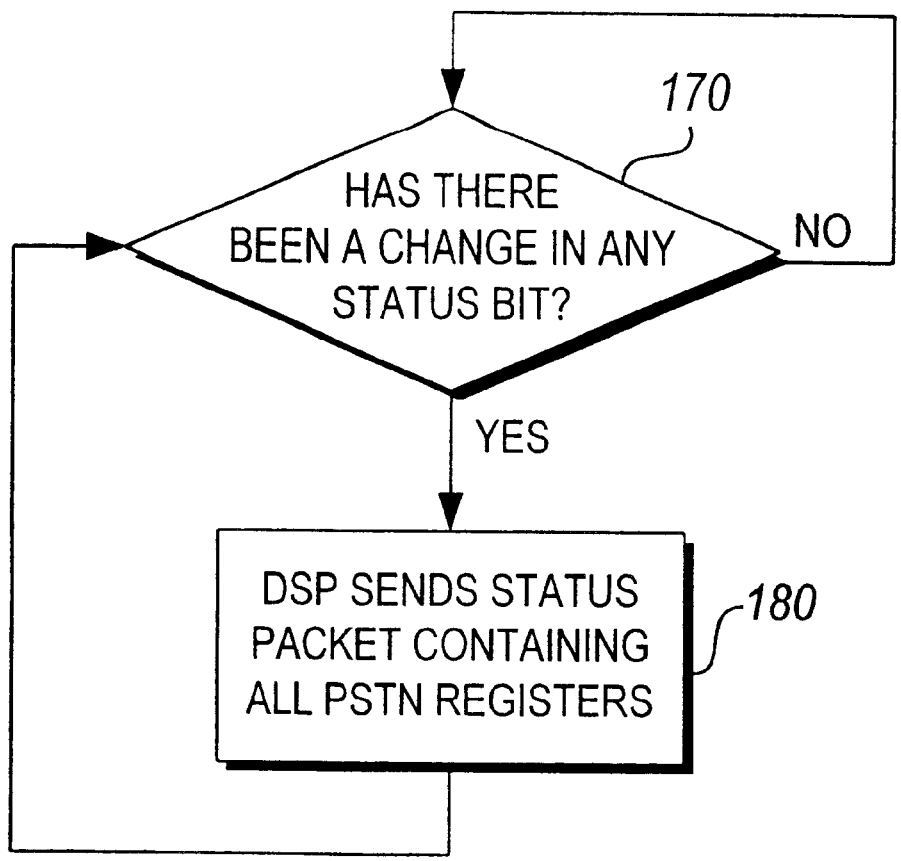
FIG. 1B is a flow chart of a method according to the present invention to determine whether there has been a change in a status bit and to direct transmission of a status packet to the central processor containing status information regarding all PSTN and other peripheral registers.

Referring to FIG. 1B there is shown a flow chart of a method according to the present invention to determine whether there has been a change in a status bit of DSP 40 and to direct transmission of a status packet to the control processor which contains status information regarding public switch telephone network (PSTN) and other peripheral registers in DSP 40, as will be discussed in greater detail below. In particular, according to the present invention, a determination is made 170 whether there has been a change in any status bit of DSP status registers 42 (in FIG. 2) of DSP 40. If not, the determination of status bit change is performed again at particular repeated times. According to one embodiment of the present invention, the status bit change determination is made within DSP 40. If there has been a change in status bit, DSP 40 forms a status packet for transmission to the control processor containing status information on the content of particular registers including but not limited to transmit FIFOs 41 of DSP 40, public switch telephone network (PSTN) registers of DSP 40, and, for example, 200 byte FIFOs 43. The formal status packet is then sent 180 to the control processor. According to the present invention, a neediest channel is selected by comparing candidate channels in each direction, in terms of bits per second. Information is packaged to enable interrupt prosecution. Packaging begins when a threshold fill level in a buffer associated with the neediest channel is reached in a particular direction. Information is packaged with header information and formation of subpackets from buffer data associated with respective channels for a particular COMMRAM direction. When data is received by a destination buffer, it is decomposed responsive to interrupt by the control processor (CP) with reference to a channel coding model into data corresponding to particular predetermined channels. The information in the status packet provided by DSP 40 permits the control processor 41 to schedule and transmit additional data through COMMRAM 36 with increased communication efficiency.

Figure 1C:
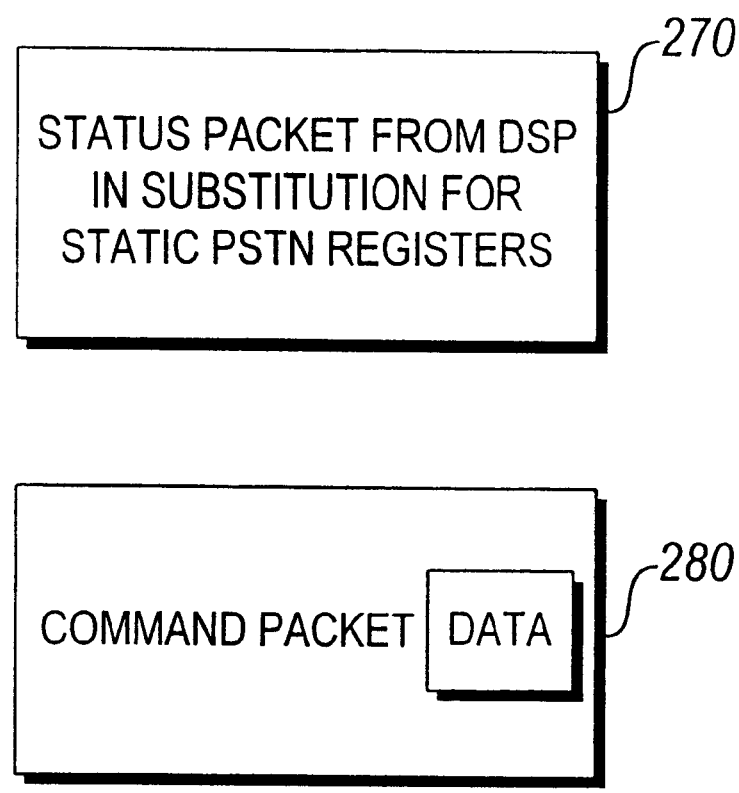
FIG. 1C is a diagram of status and command (including data) packets which are received by the control processor from a digital signal processor (DSP), according to the present invention.

Referring to FIG. 1C there is shown a diagram of status and command packets, respectively 270 and 280, which are received by the control processor 47 from DSP 40, according to the present invention. According to the present invention, information on DSP and COMMRAM status is provided by communication of status packets within the DSP system. Further according to the present invention, a generalized packet data structure is employed within the DSP system which transmits command information as data, obviating the need separately to provide command packet data structures. The allocation of COMMRAM resources for two way data transfer according to the present invention is accomplished in one embodiment according to the following COMMRAM memory map:

TABLE 1A

Communications RAM Memory Map for DSP to CP Area

| CP Address | Definition | DSP Address |
|---|---|---|
| 00–13h | RESERVED | 280 289h |
| 14h | Number of Active Channel | 28Ah |
| 15h | spare | |
| 16h | Channel 0 ID | 28Bh |
| 17h | Packet 0 ID | |
| 18h | Channel 0 Length | 28Ch |
| 19h | Channel 0 Status | |
| 1Ah | Channel 0 data byte 0 | 28Dh |
| 1Bh | Channel 0 data byte 1 | |

TABLE 1A-continued

Communications RAM Memory Map for DSP to CP Area

| CP Address | Definition | DSP Address |
|---|---|---|
| 1Ch | . | 28Eh |
| 1Dh | | |
| 1Eh | . | 28Fh |
| 1Fh | | |
| . | | . |
| . | | . |
| . | | . |
| 80h | | 20Ch |
| 81h | | |

TABLE 1B

Communications RAM Memory Map for CP to DSP Area

| CP Address | Definition | DSP Address |
|---|---|---|
| 82h | Number of Active Channel (0–15) | 2C1h |
| 83h | spare | |
| 84h | Channel 0 ID (0–512) | 2C2h |
| 85h | | |
| 86h | Channel 0 Length | 2C3h |
| 87h | Channel 0 Status | |
| 88h | Channel 0 data byte 0 | 2C4h |
| 89h | Channel 0 data byte 1 | |
| 8Ah | . | 2C5h |
| . | . | . |
| . | . | . |
| . | . | . |
| EEh | | 2F7h |
| EFh | | |

Figure 1D:
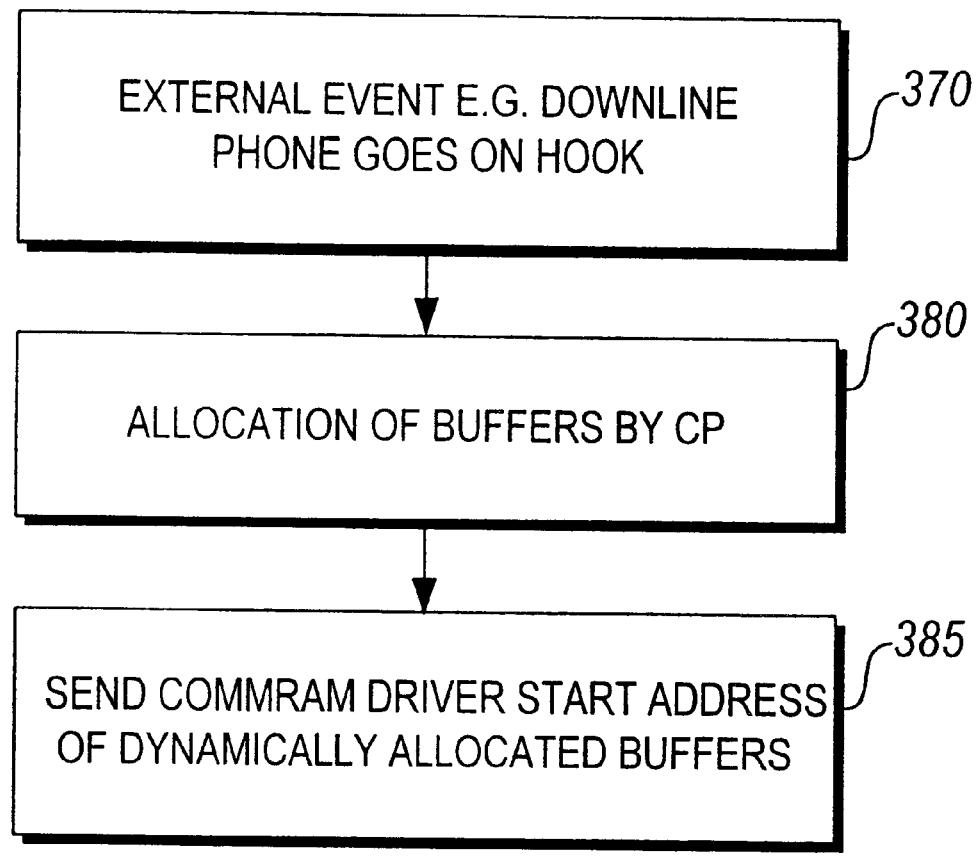
FIG. 1D is a flow chart of data transfer initiation, according to one embodiment of the present invention, permitting selected channels and buffers to be allocated by the control processor and providing the COMMRAM driver with a COMMRAM start address of dynamically allocated buffers for the respective channels.

Referring to FIG. 1D there is shown a flow chart of data transfer initiation, according to one embodiment of the present invention, permitting selected channels and buffers to be allocated by the control processor and providing the COMMRAM driver with a COMMRAM start address of dynamically allocated buffers for the respective channels. The COMMRAM memory map indicated above enables bidirectional data transfers between the central processor and DSP 40. The memory space of COMMRAM 15 is divided according to the present invention into dynamically reconfigurable active and inactive channels corresponding with selected control processor buffers. Additional data carrying channels can be requested and are acknowledged as needed, according to the present invention, causing the control processor 47 to allocate available buffer spaces. Predetermined events can trigger reallocation of buffers and channels. For example, reallocation can be triggered by occurrence of an event, such as when a downline phone goes on hook, according to the sequence of events shown in FIG. 1D. In particular, a buffer and channel reallocation within COMMRAM 36 can occur at the happening 370 of any of a number of external events in which a particular peripheral of any kind comes online for communication with one of DTE's 11. In response to a peripheral coming on line, the control processor (CP) 47 allocates at least a single COMMRAM channel and associated buffers to the applicable peripheral so that combined two-way voice and data transfers can be initiated and prosecuted. Allocation of the particular channels and associated buffers is controlled by a COMMRAM driver circuit 34.

Figure 1E:
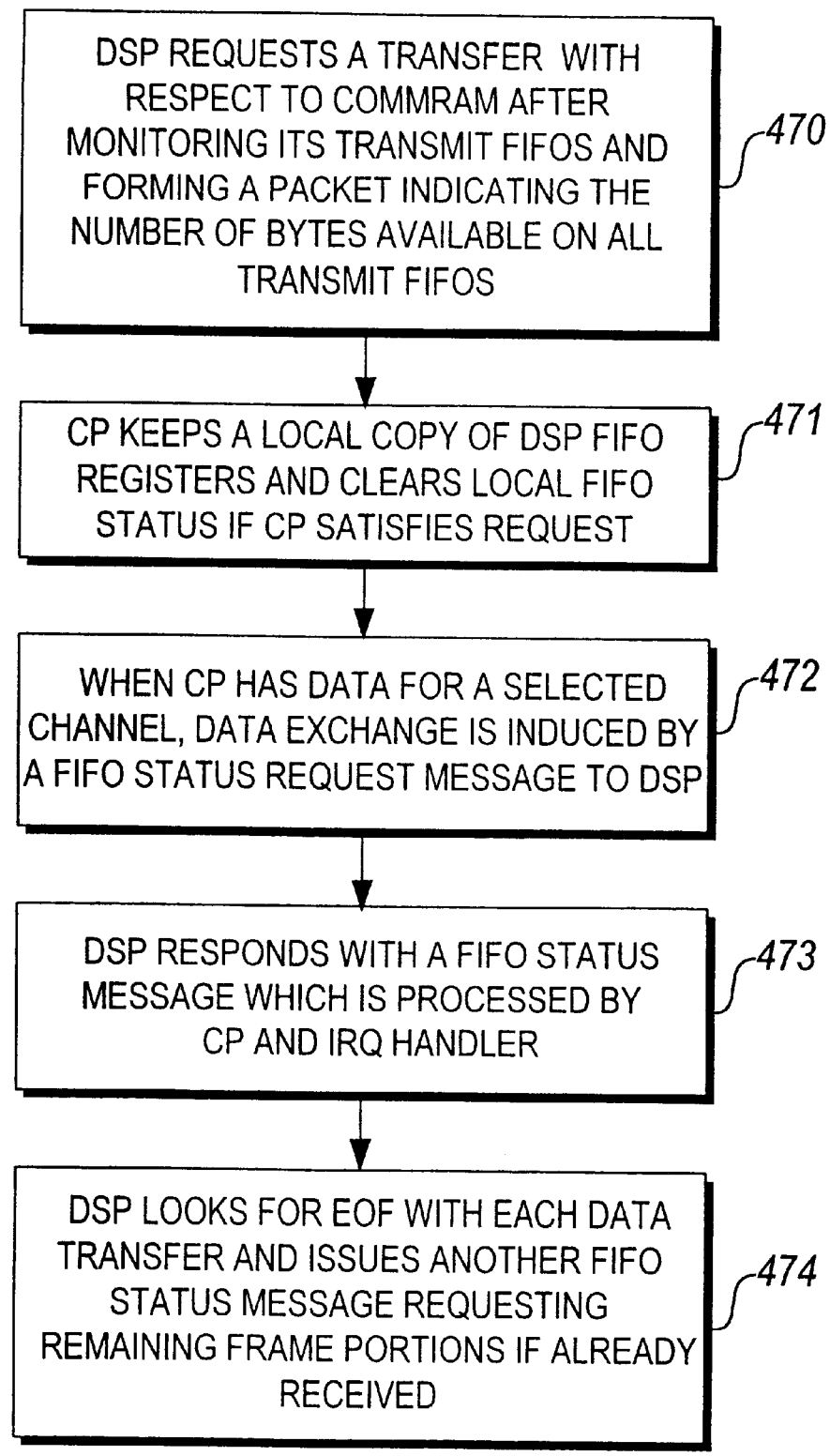
FIG. 1E is a flow chart of data transfer initiation in accordance with one embodiment of the present invention.

Referring to FIG. 1E there is shown a flow chart of data transfer initiation in accordance with one embodiment of the present invention. Data transfers according to one embodiment of the present invention are initiated as shown in FIG. 1E. In particular, the data transfers are conducted in steady state according to the process of simultaneous voice and data information transmission and reception through a run-time reconfigurable COMMRAM memory space having a plurality of cooperative channels and buffers. A data transfer is for example initiated in response to an interrupt request from DSP 40, according to FIG. 1E. Specifically, DSP 40 monitors 470 a plurality of transmit FIFO(S) 41 to determine whether or not they are currently fully loaded with data. When a FIFO falls below a predetermined "low water" mark of data loading, DSP 40 forms a superpacket including a status subpacket and a plurality of data subpackets corresponding to voice or data channels providing information in a particular direction. The status packet contains information regarding the number of bytes available for additional data in the various transmit FIFOs of DSP 40. The status packet is transmitted by DSP 40 on a system data bus and includes, according to one embodiment, channel ID information, packet ID information, packet status information, and information regarding channel and FIFO availability. According to one embodiment of the present invention, the status packet is organized as follows:

TABLE 2

| Byte | Contents | Value |
|---|---|---|
| 0 | Channel ID | 5 |
| 1 | Packet ID | TBD |
| 2 | Packet Length | 1-n |
| 3 | Status | 0 |
| 4 | Channel 0 Transmit FIFOs Bytes Available | |
| 5 | Channel 1 Transmit FIFOs Bytes Available | |
| 6 | . | |
| 7 | . | |
| 8 | Channel n transmit FIFOs Bytes Available | |

It is particularly desirable according to an embodiment of the present invention not to have the CP and DSP 40 go out of synchronization with respect to FIFO levels. For example, if the CP writes 50 bytes of data to communications RAM 36 in Channel 3, and if DSP 40 is unaware of this write activity, DSP 40 may send a data request indicating the need for 100 more bytes of data for Channel 3. As a consequence, COMMRAM 36 becomes overbooked. When the control processor completes writing and begins to process the request for an additional 100 bytes, the DSP's transmit FIFO will overflow. To prevent such an excessive buffer loading condition, DSP 40 does not issue any new data requests until the CP 47 has filled all outstanding data requests. To enable such an order of sequencing, the CP 47 maintains 471 a local copy of applicable DSP FIFO registers for immediate reference. As the CP 47 transmits data to DSP 40, the corresponding local FIFO status indications are cleared 471. If the CP 47 cannot satisfy the request to transmit the data to DSP 40 upon request, the empty status value for the applicable DSP buffer is not cleared. When the CP 47 has data available for that channel, it will induce 472 a data exchange by issuing a "FIFO Status Request" message to DSP 40. DSP 40 will respond 473 with a FIFO status message, and the CP and the IRQ handler of the CP will respond to check if the CP data can be provided to an applicable DSP FIFO.

Figure 1F:
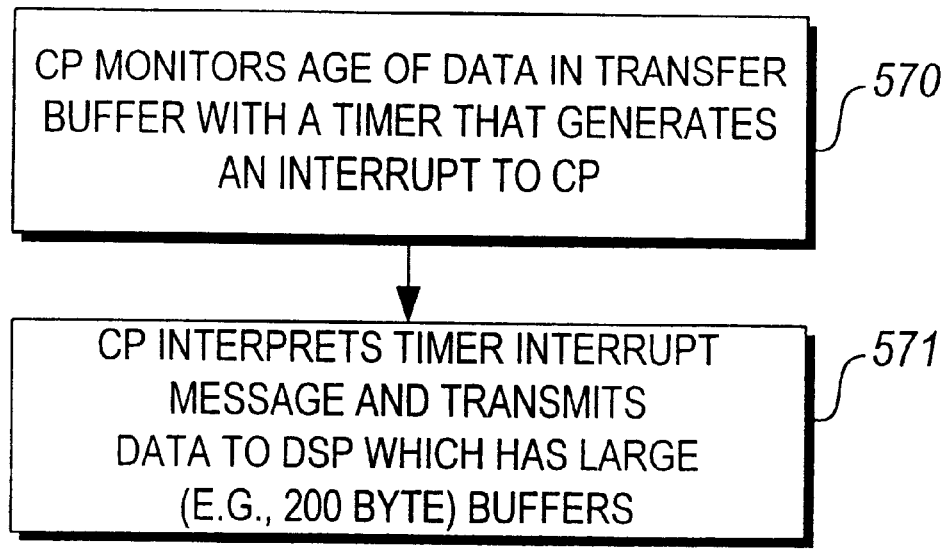
FIG. 1F is a flow chart of information transfer for time critical (e.g., vocoder) data, according to one embodiment of the present invention.

Referring to FIG. 1F there is shown a flow chart of information transfer for time critical (e.g., vocoder) data, according to one embodiment of the present invention. Transfers are particularly initiated, according to one embodiment of the present invention, as shown in FIG. 1F. In particular, FIG. 1F is a flow chart of data transfer for time critical (e.g., vocoder) data, according to one embodiment of the present invention. A timing mechanism prohibits data from remaining in the transmit buffer too long. Even though not enough data may exist at the control processor to justify initiation of a transfer, transmission is forced based on the age of the existing data. Such transmission is implemented according to one embodiment of the present invention with a timer (e.g., CP timer interrupt mechanism 821 in FIG. 2) that generates 570 an interrupt to the central processor (CP). The CP 47 interprets 571 the interrupt message and, if available, transmits applicable amounts of data for each channel as requested by DSP 40. In doing so, DSP 40 keeps the level of its FIFOs high and avoids under-running of FIFO capacity as well. DSP 40 according to one embodiment contains particular FIFOs 43 containing on the order of one hundred to two hundred bytes to cooperate effectively with COMMRAM 36, as shown in FIG. 1A.

Figure 1G:
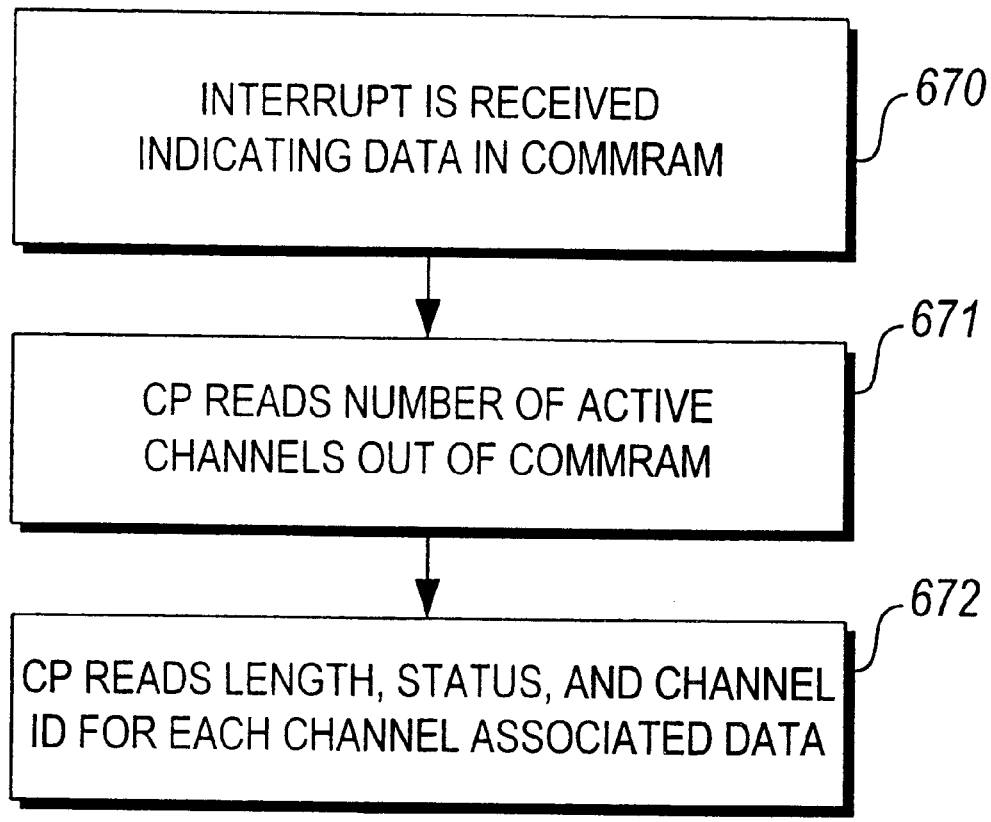
FIG. 1G is a flow chart of data reception according to one embodiment of the present invention.

Referring to FIG. 1G there shown a flow chart of data reception according to one embodiment of the present invention. The mechanism for receiving data according to the present invention is similar to the mechanism for sending data except for the addition of Channel ID's in transmission packets. Upon reception 670 of an interrupt by the CP 47 in response to CP timer interrupt mechanism 821(FIG. 2), for example, indicating that there is data available, the central processor reads 671 the number of active channels out COMMRAM 36. That value is used to read 672 length, status, and channel ID information for each channel and the data associated with it. The channel ID field is used to direct data to an appropriate destination. The particular channel ID fields according to the present invention are defined as follows:

TABLE 3

| Channel ID | Data Type | DSP to CP | CP to DSP |
|---|---|---|---|
| 0 | Command Packet | Identical to ICD version 1.8 | Identical to ICD version 1.8 |
| 1 | Local Handset/ Mic & Speakers | Voice in (raw sample or encoded) | Voice out |
| 2 | Bulk Delay | Data for storage | Retrieved data |
| 3 | PSTN Data | Transmit frames of data, voice, etc. | Rx'd frames of far-end data, voice, etc. |
| 4 | Debug Packet | Response Packet | Debug Command Packet |
| 5 | DSP Status | FIFO Status Packet PSTN Register Packet | N/A |
| 6 | PSTN Auxiliary | V.34 Channel 2 (200 bps) | N/A |
| 7 | . | | |
| . | | | |
| . | | | |
| 255 | TBD | TBD | TBD |

Figure 2:
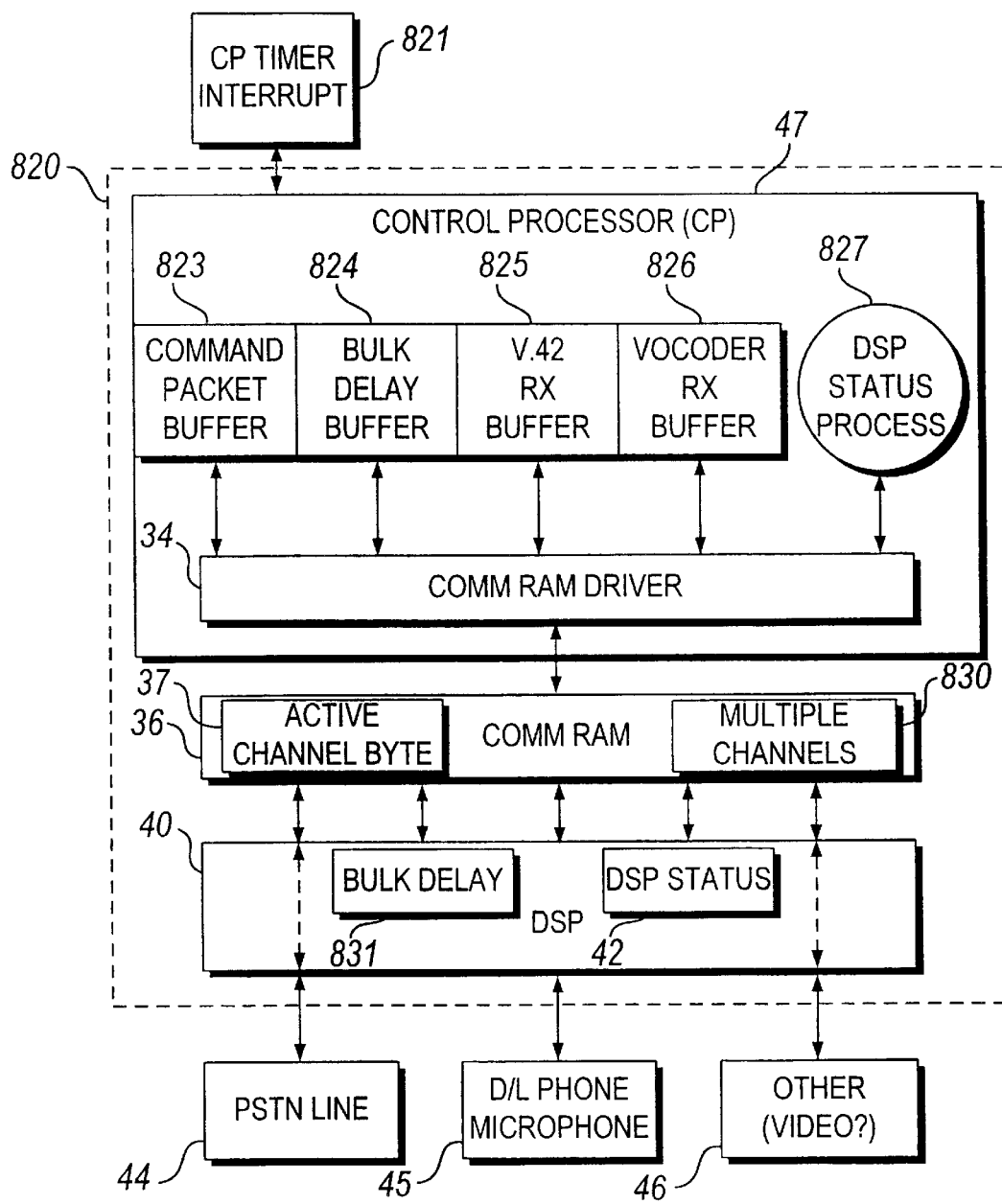
FIG. 2 is a block diagram of a digital simultaneous voice and data (DSVD) and stat mux system according to the prior art.

Referring to FIG. 2 there is shown a block diagram of the digital simultaneous voice and data (DSVD) and stat mux system (DSS). DSS 820 particularly includes a control processor (CP) 822, a communication RAM (COMMRAM) driver 34, a communications RAM 36, and a digital signal processor (DSP) 40. Control processor 822 includes a command packet buffer 823, a bulk delay buffer 824, a receiver buffer 825, a vocoder receiver buffer 826, a DSP status process 827, and a communication RAM driver 34. Buffers 823–826 and DSP status process 822 each communicate with communication RAM driver 34. DSP 40 includes a bulk delay buffer 831 and a DSP status buffer 42. The bulk delay of the prior art slows data transmission. Communication RAM driver 34 communicates bidirectionally with COMMRAM 25. However, according to an embodiment of the present invention, digital simultaneous voice and data (DSVD) system 820 operates dynamically reconfigurably according to data and interrupt rates according to the present invention as shown in the following table:

TABLE 4

DSVD Connection Rates

| Data Source | Interrupt Rate | Data Rates | byte/sec |
|---|---|---|---|
| PSTN Line: | 113.5 Hz | 33600 bits/sec | 4200 |
| Vocoder: | 118.5 Hz | 32 bytes/30 ms | 1067 |
| Bulk Delay: | 116 Hz | 3429 symbol/sec | 6858 |
| Diagnostic: | 100 Hz | | 100 |
| Combined: | 100 Hz | | 12225 bytes/sec |

Table 4 shows interrupt and data rates for example data sources. Each of these sources has an independent interrupt mechanism which trigger an interrupt according to the interrupt rate set forth in Table 4, for example. However, according to the method and system of the present invention, at a COMMRAM size of, for example, 105 bytes and a combined multichannel data rate of 12225 bytes per second, a combined channel interrupt rate on the order of 100 Hz results, which is approximately the interrupt rate of each channel according to the prior art. Thus, for four channels, a substantially reduced interrupt rate is achieved. For this example approximately four interrupts would occur for each interrupt according to the present invention.

Based upon the data rates which can be produced in accordance with the present invention, the following relationships of RAM and interrupt frequencies and intervals can be obtained:

TABLE 5

| Amount of Communications RAM Available for DATA Transfers | Minimal Required IRQ Frequency | Maximum Required IRQ Interval |
|---|---|---|
| 32 bytes | 382 Hz | 2.6 ms |
| 64 bytes | 191 Hz | 5.2 ms |
| 115 bytes | 106 Hz | 9.4 ms |
| 240 bytes | 51 Hz | 20 ms |
| 480 bytes | 25 Hz | 39 ms |

The above-indicated RAM sizes, intervals and frequencies apply for bidirectional, full duplex data communication. For example, 115 bytes can be moved in each direction through a communication RAM according to the present invention every 9 milliseconds. The same example in a host based platform according to the prior art where a bulk delay 26' is retained in a DSP, results in a relatively disadvantageous data throughput, as suggested in Table 7 below for the data sources and rates indicated in Table 6:

TABLE 6

DSVD Connection

| Data Source | Data Rates | byte/sec |
|---|---|---|
| PSTN Line: | 33600 bits/sec | 4200 |
| Vocoder: | 32 bytes/30 ms | 1067 |
| Bulk Delay: | 0 symbol/sec | 0 |
| Misc.: | | 100 |
| | | 5367 bytes/sec |

TABLE 7

| Amount of Communications RAM Available for DATA Transfers | Minimal Required IRQ Frequency | Maximum Required IRQ Interval |
|---|---|---|
| 32 | 168 Hz | 6 ms |
| 64 | 84 Hz | 12 ms |
| 115 | 47 Hz | 21 ms |
| 240 | 22 Hz | 45 ms |
| 480 | 11 Hz | 89 ms |

The interrupt (IRQ) frequency required for comparable amounts of data is thus reduced according to the present invention. Nonetheless, it is not uncommon for another application on a PC or other data terminal equipment (DTE) to disable interrupts for 10's of milliseconds. To operate under these conditions, according to one embodiment of the present invention, requires buffering as much data as possible to prevent loss of data while interrupts are turned off. For example, a TAM playback application would require 22000 bytes/sec of throughput. The prior art would need to support this rate with the indicated breakdown of RAM size versus interrupt frequency.

In the above-identified case, an entire interrupt routine would need to be completed within a particular indicated time. In actuality, the number is even less due to interrupt overhead. According to the present invention, a digital simultaneous voice and data system transfers simultaneously multiple channels of data. The communications RAM (i.e., COMMRAM) according to the present invention is dynamically divided into multiple divisions, and according to one embodiment of the present invention, the data channels are capable of being concatenated. In particular, the data or information from each channel is structured into a subpacket. The subpackets are organized (i.e., concatenated) into a superpacket for transmission through the COMMRAM. Each superpacket is transmitted in connection with an asserted interrupt, and each superpacket includes a header and a status subpacket.

TABLE 8

Version 1.8 Data Configuration 7 6 5 4 3 2 1 0
Status (0–6)
Length (0–63)
data byte 0
data byte 1
data byte 2
data byte 3
.
.
.

According to one embodiment of the present invention, the following configuration is employed for data for commands:

TABLE 9

Version 1.8 Command Configuration

```
7  6  5  4  3  2  1  0
      Packet ID (0–255)
           spare
        Packet Length
           spare
         data byte 0
         data byte 1
              .
              .
              .
```

Further according to the present invention, command packets are established as a specific "channel" of data.

TABLE 10

Version 2.0 configuration

```
7  6  5  4  3  2  1  0
   Number of Active Channel (0–15)
       Channel 0 ID (0–255)
            Packet 0 ID
       Channel 0 Length (1–114)
          Channel 0 Status
        Channel 0 data byte 0
        Channel 0 data byte 1:
                .
                .
                .
       Channel 1 ID (0–255)
            Packet 1 ID
       Channel 1 Length (1–114)
          Channel 1 Status
        Channel 1 data byte 0
        Channel 1 data byte 1
                .
                .
                .
       Channel 2 ID (0–255)
            Packet 2 ID
       Channel 2 Length (1–114)
          Channel 2 Status
        Channel 2 data byte 0
        Channel 2 data byte 1
                .
                .
                .
```

By including command packets as a "channel," an additional 40 bytes (20 in each direction currently dedicated) can be used for other data transfers, improving throughput. In addition, this mechanism of the present invention allows for the synchronization of data and commands when required by the application. In addition, by structuring the data and command packet headers according to the same pattern, the existing code that currently processes only the command packet is available to process selected channels of data. To free further communications RAM space, a status packet is sent from the DSP to the control processor, as shown in FIGS. 1B and 1C. The DSP determines when a register has changed and initiates a packet transfer containing all the registers, accommodating event driven code.

The following is pseudocode for software employed by a control processor, according to one embodiment of the present invention, for interrupt handling in a adaptively channeled COMMRAM system in response to interrupts provided by peripherals:

```
void line_int(void)
    if (Number of Active Channels not equal 0)
    (
        for (I=1 to Number Active Channel)
        {
            read Channel ID
            switch (Channel ID)
                case (Command Packet)
                    call (Command Packet)
                    update CommRAM pointer
                    break;
                case (PSTN Data)
                    call PSTN Data Handler
                    update CommRAM pointer
                    break;
                case (Bulk Delay)
                    call Bulk Delay Handler
                    update CommRAM pointer
                    break;
                 .
                 .
                 .
        }
        Number of Active Channels = 0;/* clear semaphore */
    }
    call superpacket transmit handler
        The following is pseudo code, according to the
    present invention, for transmit handling:
    Active Channel Count = –1    /* reserve CommRAM */
    CommRAM space available = MAX_COMMRAM_SIZE
    Channel ID = 0
    Transmit Channel Count = 0
    while (CommRAM available && Channel ID <= CHANNEL_MAX)
    {
        DSP space available = FIFO Status[Channel ID]
        request amount = MIN(DSP space available, CommRAM
    available)
        if (request amount)
        {
            call transmit routine[Channel ID]
            (note: routine returns number of bytes
    written)
            CommRAM pointer += bytes written
            CommRAM space available –= bytes written
            FIFO Status[Channel ID] = 0;
            Transmit Channel Count++
        }
        Channel ID++;
    }
    Active channel count = Transmit Channel Count
    Interrupt DSP
    return
/*************************************************
/* transmit areas should be checked in this order */
Command Packet
Vocoder
Bulk Delay
PSTN data
Debut Command Packet
/*************************************************
```

Figure 3:
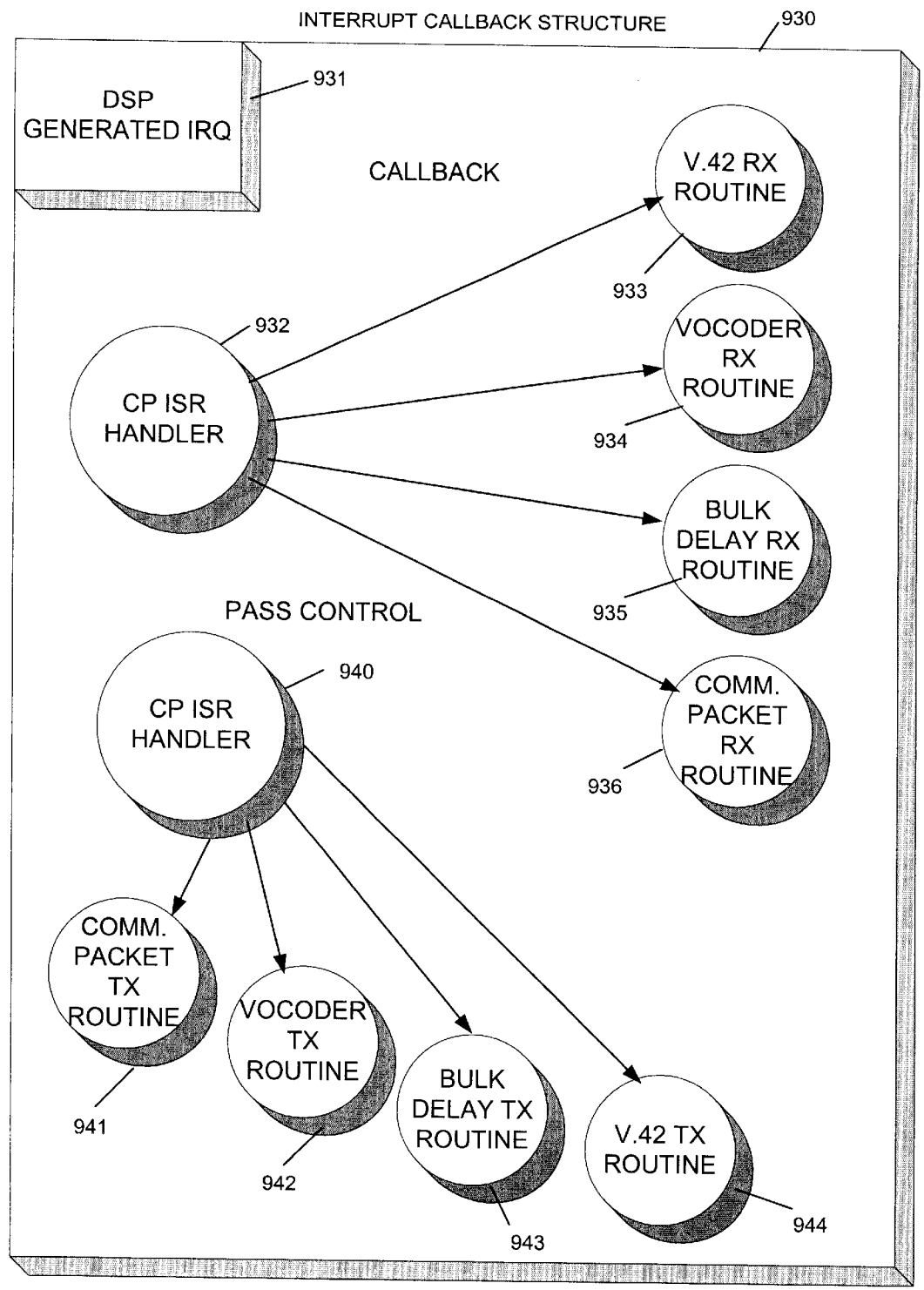
FIG. 3 is a diagram of an interrupt callback structure according to the present invention.

Referring to FIG. 3 there is shown an interrupt callback structure diagram for control processor operation, according to the present invention. In particular, interrupt callback structure 930 includes a DSP generated interrupt request 931, and first and second control processor (CP) interrupt start routine (ISR). handlers, respectively 932 and 940, connected with first CP ISR handler 932, a V.42 receiver routine 933, a vocoder receiver routine 934, a bulk delay receiver routine 935, and a communication packer receiver routine 936. Interrupt callback structure 930 further includes a communication packet transmitter routine 941, a vocoder transmitter routine 942, a bulk delay transmitter routine 943, and a V.42 transmitter routine 944. According to the present invention, control is selectively transferred between first and second CP ISR handler, respectively 932 and 940. In particular, according to the present invention, a particular first control processor controlling superpacket transmission through the COMMRAM in a first direction, will allow control to be transferred to a second control processor controlling superpacket transmission through the superpacket in a second direction, in response to formation of a superpacket constructed for transmission in the second direction. According to the present invention, after a first superpacket has been drained of subpackets, a check is made of transmission buffers controlled by the respective first and second control processors, to determine whether superpacket construction in either direction has been initiated. Once superpacket construction has been completed in one or the other direction, the receiving control processor accepts control for receiving and reacting to DSP interrupts and for draining the next anticipated superpacket in the particular transmission direction.

Figure 4:
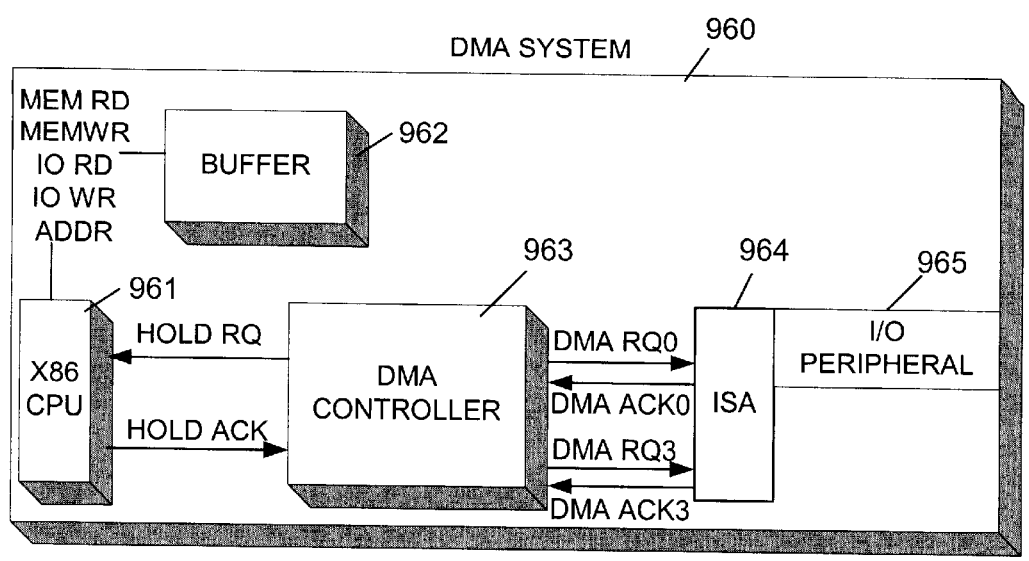
FIG. 4 is a diagram of a direct memory access (DMA) system according to the present invention.
Figure 1A:
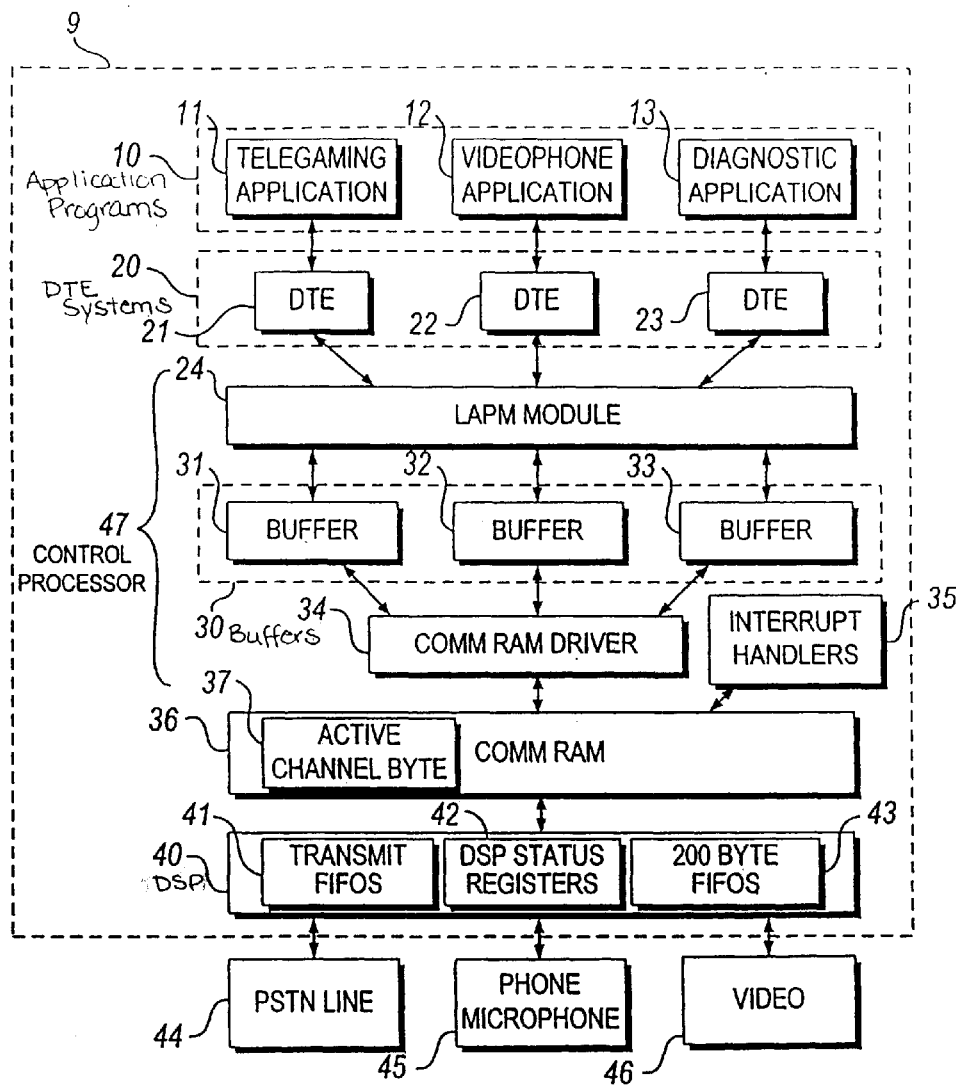
Figure 2:
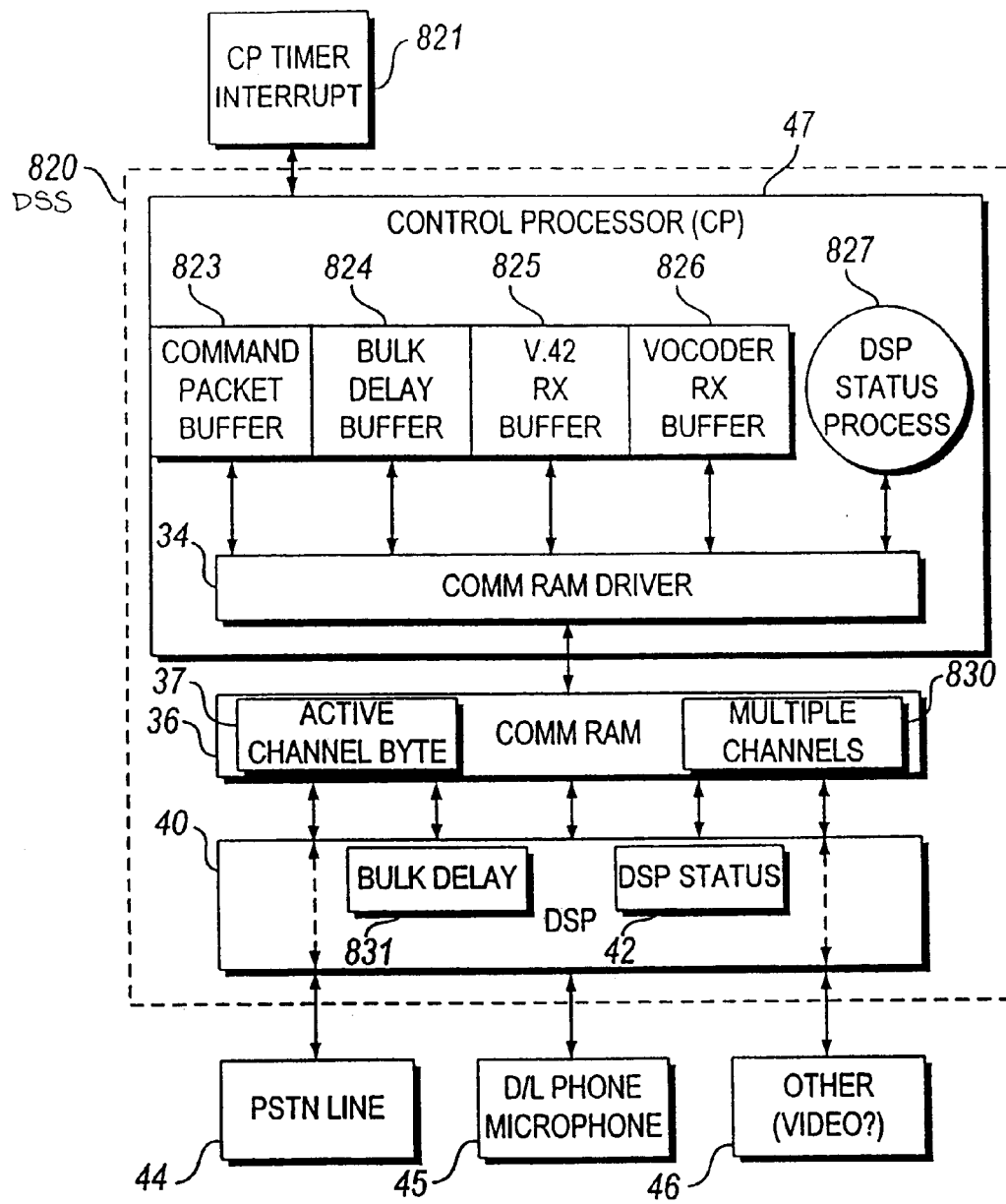

Referring to FIG. 4 there is shown a diagram of a direct memory access (DMA) system, according to the present invention. In particular, DMA system 960 includes a control processing unit (CPU) 961, a buffer 962, a DMA controller 963, and an ISA bus 964 connected to an input output peripheral 965. Buffer 962 is connected to CPU 961 with a plurality of lines including a memory read (MEMRD) line, a memory write (MEMWR) line, an input output (IO) read line, an input output (IO) write line, and an address (ADDR) line. CPU 961 is connected to DMA controller 963 with a hold request (HOLDRQ) line and a hold acknowledge (HOLDACK) line. DMA controller 963 is connected with ISA bus 964 with first and third DMA request and DMA acknowledge lines, respectively DMARQ0, DMARQ3, DMAACK0, and DMAACK3. ISA bus 964 is connected to a plurality of input output (I/O) lines to peripherals (not shown). The peripherals initiate all DMA exchanges. DMA based communication occurs between CP 961 and a DSP (not shown).

According to the present invention, a digital simultaneous voice and data (DSVD) system includes a communications random access memory (COMMRAM) including dynamically reconfigurable COMMRAM channel memory regions for concurrently channeled bidirectional data traffic, a digital signal processor (DSP) including a plurality of FIFO elements for storing information to be communicated with selected external peripheral systems, and a control processor including a communication RAM (COMMRAM) driver, a digital signal processor (DSP) status process connected to said COMMRAM driver, and a plurality of data buffers for containing information communicated in COMMRAM channel memory regions. The COMMRAM driver is connected to the DSP and the COMMRAM, and is workable for dynamically remapping the COMMRAM to adapt to changed directions and volumes of data traffic.

In summary, according to the present invention, a digital simultaneous voice and data (DSVD) system includes a control processor (CP) which has a communication RAM (COMMRAM) driver, a digital signal processor (DSP) status process connected to said COMMRAM driver, and data buffers. The DSVD system further includes a COMMRAM including memory regions dynamically allocatable for concurrent bidirectional data traffic and a digital signal processor (DSP). The COMMRAM driver is connected to the DSP and the COMMRAM. The COMMRAM driver is effective for dynamically remapping the COMMRAM for multidirectional data traffic. As a consequence of the dynamic reconfigurability of the bidirectional COMMRAM and the DSP providing status information to control processor buffers about DSP loading, data throughput between the central processor (CP) and the digital signal processor (DSP) is substantially increased. The allocation of COMMRAM memory spaces under control of the COMMRAM driver facilitates simultaneous bidirectional data communication and reduces interrupt frequency and consequent latency and the amount of time spent in the interrupt handling. The digital simultaneous voice and data (DSVD) and statistical multiplexing (stat mux) system according to the present invention provides a communication random access memory interface which is portable to a direct memory access (DMA) system communications system between a digital signal processor (DSP) and a central processor (CP).

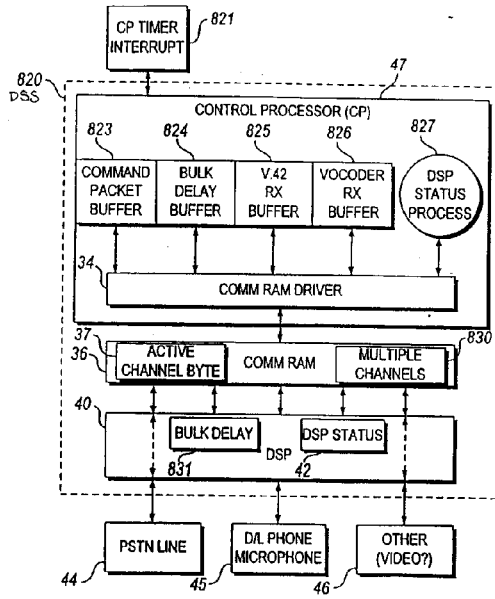

What is claimed is:

1. A method comprising:
   a first processor parsing a superframe comprising data packets of a plurality of data types into individual data packets;
   the first processor buffering the individual data packets by placing the individual data packets into a plurality of buffers based, at least in part, on a data type of the plurality of data types associated with each individual data packet;
   the first processor transmitting the data packets from the plurality of buffers to a second processor by forwarding the data packets from the plurality of buffers to a plurality of dynamically reconfigurable channels of a communication random access memory (COMMRAM), wherein each buffer of the plurality of buffers is associated with at least one dynamically reconfigurable channel.

2. The method according to claim 1, wherein one data type of the plurality of data types comprises a command data type.

3. The method according to claim 2, wherein a packet of command data type comprises data regarding the status of the plurality of buffers.

4. The method according to claim 1, wherein the COMMRAM accommodates a flexible number of data types by having a programmable number of dynamically reconfigurable channels.

5. The method according to claim 1, further comprising generating an interrupt corresponding to each superframe.

6. The method according to claim 5, further comprising the first processor responding to the interrupt by dynamically reconfiguring the channels of the COMMRAM.

7. A method comprising:
   a step for parsing a superframe comprising data packets of a plurality of data types into individual data packets;
   a step for forwarding the individual data packets into a plurality of buffers;
   a step for transmitting the data packets from the plurality of buffers to a plurality of dynamically reconfigurable channels of a communication random access memory (COMMRAM), wherein each buffer of the plurality of buffers is associated with at least one dynamically reconfigurable channel.

8. The method according to claim 7, wherein one data type of the plurality of data types comprises a command data type.

9. The method according to claim 8, wherein a packet of command data type comprises data regarding the status of the plurality of buffers.

10. The method according to claim 7, wherein the COMMRAM accommodates a flexible number of data types by having a programmable number of dynamically reconfigurable channels.

11. The method according to claim 7, further comprising the step of generating an interrupt corresponding to each superframe.

12. The method according to claim 11, further comprising the step of dynamically reconfiguring the channels of the COMMRAM in response to the interrupt.

13. A digital simultaneous voice and data (DSVD) system, comprising:
- a communications random access memory (COMMRAM) for communication between a Control Processor (CP) and a Digital Signal Processor (DSP), the COMMRAM to dynamically allocate portions of the COMMRAM to CP buffers on the CP and DSP buffers on the DSP based on bandwidth requirements of the CP and DSP buffers selected for communication either from the CP to the DSP or from the DSP to the CP, wherein the bandwidth of the CP and DSP buffers is reconfigurable.

14. The DSVD system of claim 13, wherein each CP and DSP buffer is associated with a portion of the COMMRAM based on a channel ID and a direction of communication.

15. The DSVD system of claim 13, wherein the COMMRAM reallocates portions of the COMMRAM in response to interrupts.

16. A digital simultaneous voice and data (DSVD) system, comprising:
- a Control Processor (CP) including a first plurality of buffers;
- a Digital Signal Processor (DSP) including a second plurality of buffers; and
- a Communication Random Access Memory (COMMRAM) interposed between the CP and the DSP to facilitate bidirectional communication between the CP and the DSP by dynamically and simultaneously allocating portions of the COMMRAM to the first plurality of buffers and to the second plurality of buffers depending on a direction of communication, wherein the plurality of first and second buffers is reconfigurable.

17. The DSVD system of claim 16, wherein the COMMRAM reallocates portions of the COMMRAM in response to interrupts from at least one of the CP or the DSP.

* * * * *

UNITED STATES PATENT AND TRADEMARK OFFICE
CERTIFICATE OF CORRECTION

PATENT NO. : 6,526,068 B2
DATED : February 25, 2003
INVENTOR(S) : Abramson

It is certified that error appears in the above-identified patent and that said Letters Patent is hereby corrected as shown below:

The title page showing an illustrated figure, should be deleted and substituted therefor the attached title page.

Delete drawing sheets 1 & 8, consisting of figures 1A & 2, and substitute therefor the attached drawing sheets 1 & 8, consisting of figures 1A &2.

Signed and Sealed this

Sixteenth Day of September, 2003

JAMES E. ROGAN
*Director of the United States Patent and Trademark Office*

(12) United States Patent
Smith

(10) Patent No.: US 6,526,068 B2
(45) Date of Patent: Feb. 25, 2003

(54) INTERFACE CONTROL OF COMMUNICATION BETWEEN A CONTROL PROCESSOR AND A DIGITAL SIGNAL PROCESSOR

(75) Inventor: Wesley H. Smith, Raleigh, NC (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/024,423

(22) Filed: Dec. 17, 2001

(65) Prior Publication Data

US 2002/0085575 A1 Jul. 4, 2002

Related U.S. Application Data

(63) Continuation of application No. 08/940,797, filed on Sep. 30, 1997.

(51) Int. Cl.[7] .............................. H04J 3/24; G06F 3/00; G06F 3/02; G06F 3/05; G06F 3/06; G06F 5/00
(52) U.S. Cl. ........................................ 370/474; 710/52
(58) Field of Search .................... 370/389, 412–418, 370/464–466, 474; 710/22, 52, 56

(56) References Cited

U.S. PATENT DOCUMENTS

| | | | |
|---|---|---|---|
| 4,578,789 A | 3/1986 | Middleton et al. | 370/58 |
| 4,589,107 A | 5/1986 | Middleton et al. | 370/62 |
| 4,644,527 A | 2/1987 | Anderson et al. | 370/58 |
| 4,672,602 A | 6/1987 | Hargrave et al. | 370/58 |
| D293,317 S | 12/1987 | Umezu et al. | D14/52 |
| 4,782,482 A | 11/1988 | Kiatipov et al. | 370/86 |
| 4,987,492 A | 1/1991 | Stults et al. | 358/181 |
| 5,214,650 A | 5/1993 | Renner et al. | 370/110.1 |
| 5,359,709 A * | 10/1994 | Blanc et al. | 375/222 |
| 5,469,558 A * | 11/1995 | Lieberman et al. | 710/105 |
| 5,475,691 A | 12/1995 | Chapman et al. | 370/110.4 |
| 5,475,713 A | 12/1995 | Bremer et al. | 375/261 |
| 5,487,175 A | 1/1996 | Bayley et al. | 455/54.2 |
| 5,506,866 A | 4/1996 | Bremer et al. | 375/216 |
| 5,513,212 A | 4/1996 | Bremer | 375/222 |
| 5,513,251 A | 4/1996 | Rochkind et al. | 379/93 |
| 5,559,791 A | 9/1996 | Bremer et al. | 370/20 |
| 5,600,649 A | 2/1997 | Sharma et al. | 370/435 |
| 5,761,516 A * | 6/1998 | Rostoker et al. | 709/100 |
| 5,805,636 A * | 9/1998 | Rao et al. | 375/222 |
| 5,838,994 A | 11/1998 | Valizadeh | 711/171 |
| 5,909,559 A | 6/1999 | So | 710/127 |
| 5,923,852 A | 7/1999 | Lee et al. | 709/234 |
| 6,108,343 A * | 8/2000 | Cruickshank et al. | 370/259 |

* cited by examiner

Primary Examiner—Kwang Bin Yao
Assistant Examiner—Kevin L. Harper
(74) Attorney, Agent, or Firm—Blakely, Sokoloff, Taylor & Zafman LLP

(57) ABSTRACT

A digital simultaneous voice and data (DSVD) system includes a communication random access memory (COMMRAM) driver and interface for dynamically remapping COMMRAM memory contents. The communication RAM is portable to selected hardware including direct memory address (DMA) based communications equipment and is connected between a digital signal processor (DSP) and a control processor (CP).

17 Claims, 10 Drawing Sheets